United States Patent [19]
Niewyk et al.

[11] 3,707,856
[45] Jan. 2, 1973

[54] TOTAL SENSING COMBINATION WASHER-DRYER

[75] Inventors: Anthony Niewyk, St. Joseph; Donald E. Janke, Benton Harbor, both of Mich.

[73] Assignee: Whirlpool Corporation, Benton Harbor, Mich.

[22] Filed: Jan. 14, 1971

[21] Appl. No.: 136,276

Related U.S. Application Data

[62] Division of Ser. No. 730,358, May 20, 1968, Pat. No. 3,575,193.

[52] U.S. Cl. ..................68/12 R, 68/20, 68/207, 68/208
[51] Int. Cl. ............................................D06f 33/02
[58] Field of Search ..............................68/12 R, 20

[56] References Cited

UNITED STATES PATENTS

| | | | |
|---|---|---|---|
| 3,358,302 | 12/1967 | Candor | 68/20 X |
| 3,246,182 | 4/1966 | Hanchett | 68/12 R |
| 3,398,295 | 8/1968 | Fathauer | 68/12 R |
| 3,464,673 | 9/1969 | Cargo et al. | 68/12 R |
| 3,539,153 | 11/1970 | Wennerberg et al. | 68/12 R |

*Primary Examiner*—William I. Price
*Attorney*—Gene A. Heth

[57] ABSTRACT

A semielectronic control system for a combination washing and drying machine utilizing a solenoid-actuated stepping switch, each successive position of the switch controlling such functions as water fill, agitate, drain, extract, and dry making up the washer-dryer's cycle of operation. Energization of the solenoid is controlled either by RC timer circuitry having a number of selective delays or by circuitry responsive to sensed conditions. The stepping switch selects the appropriate delay in the RC timing circuitry or the proper condition responsive circuit which causes energization of the solenoid to advance the stepping switch to the next position.

9 Claims, 8 Drawing Figures

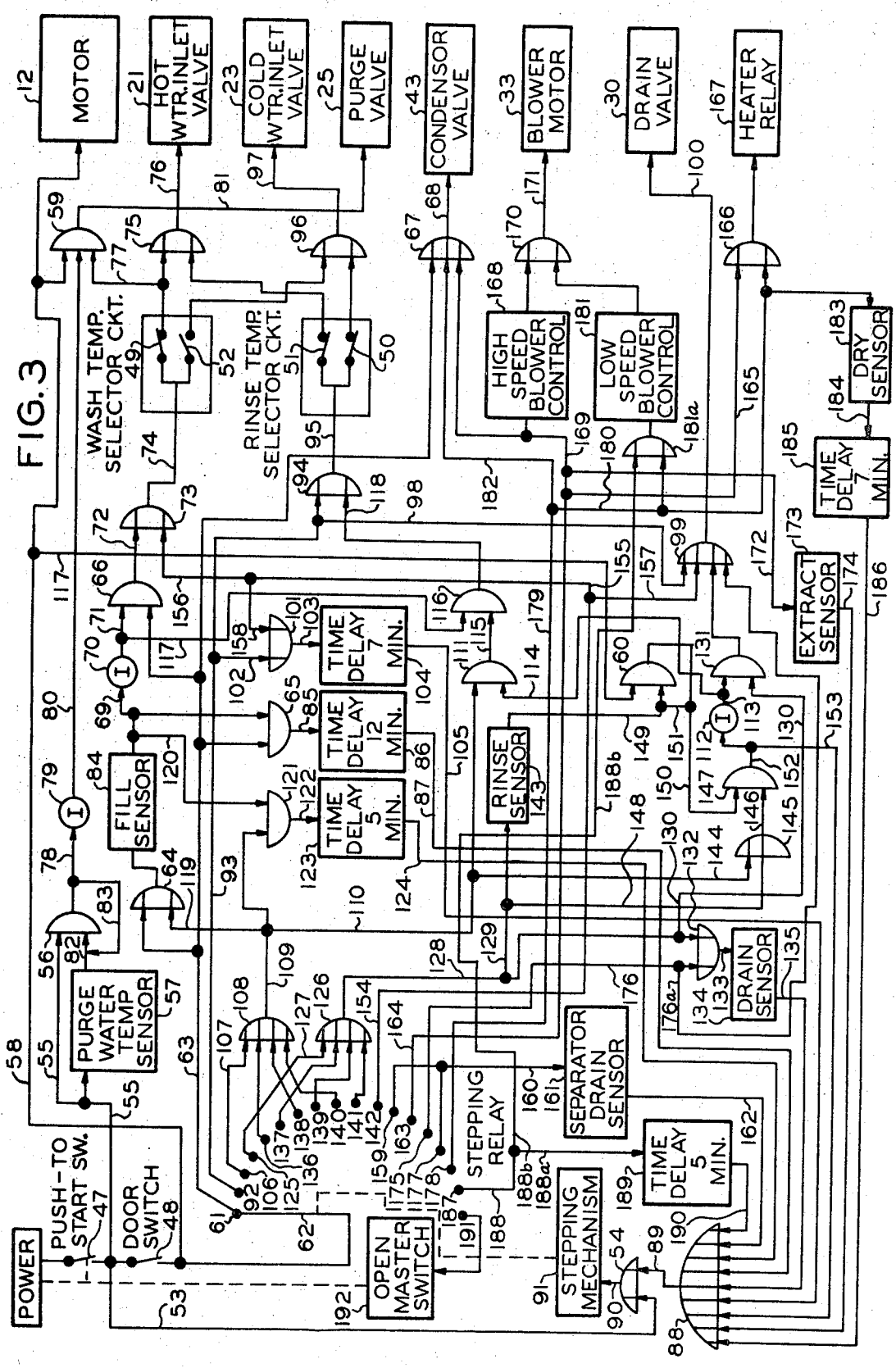

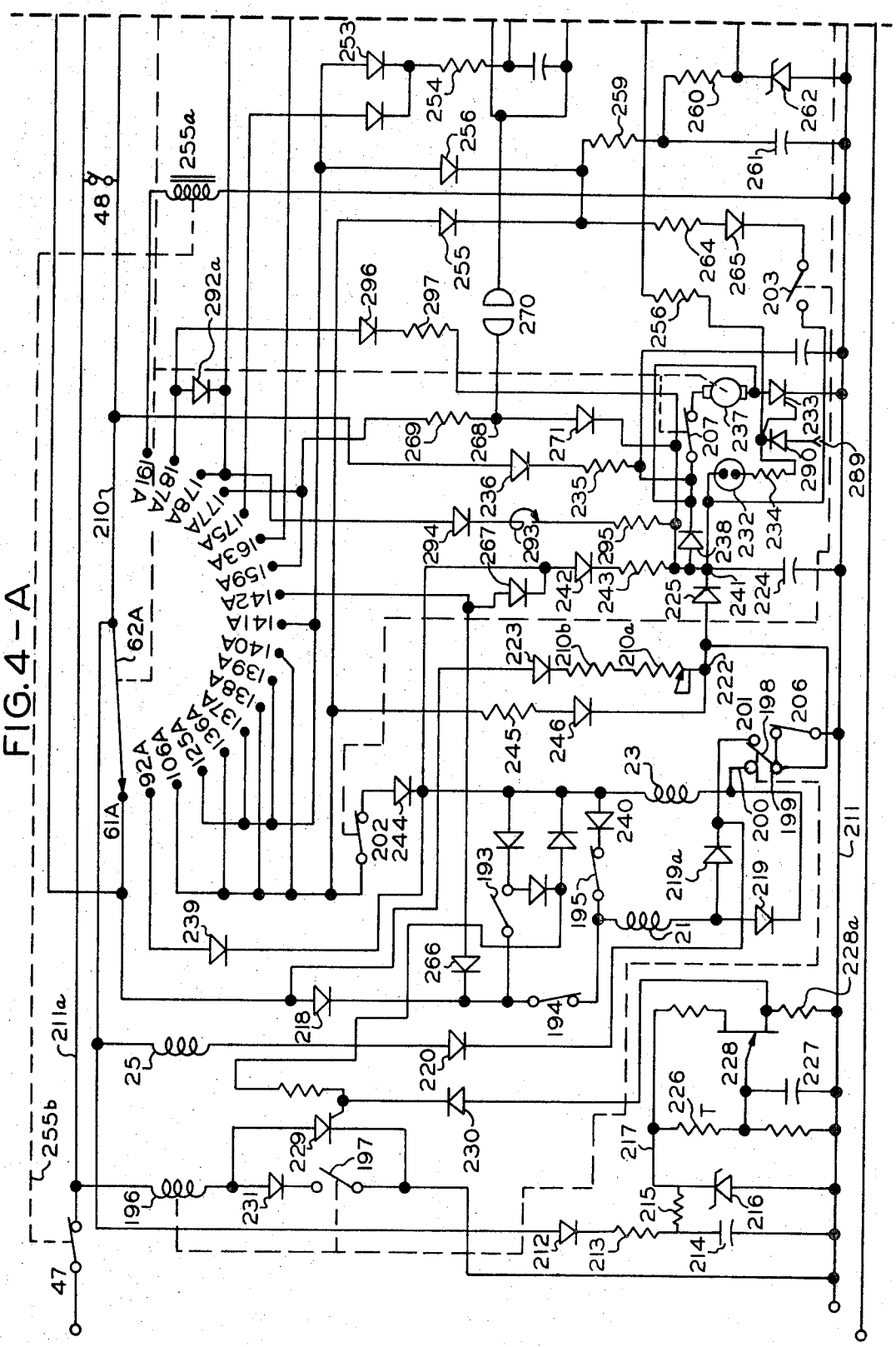
FIG.4-A

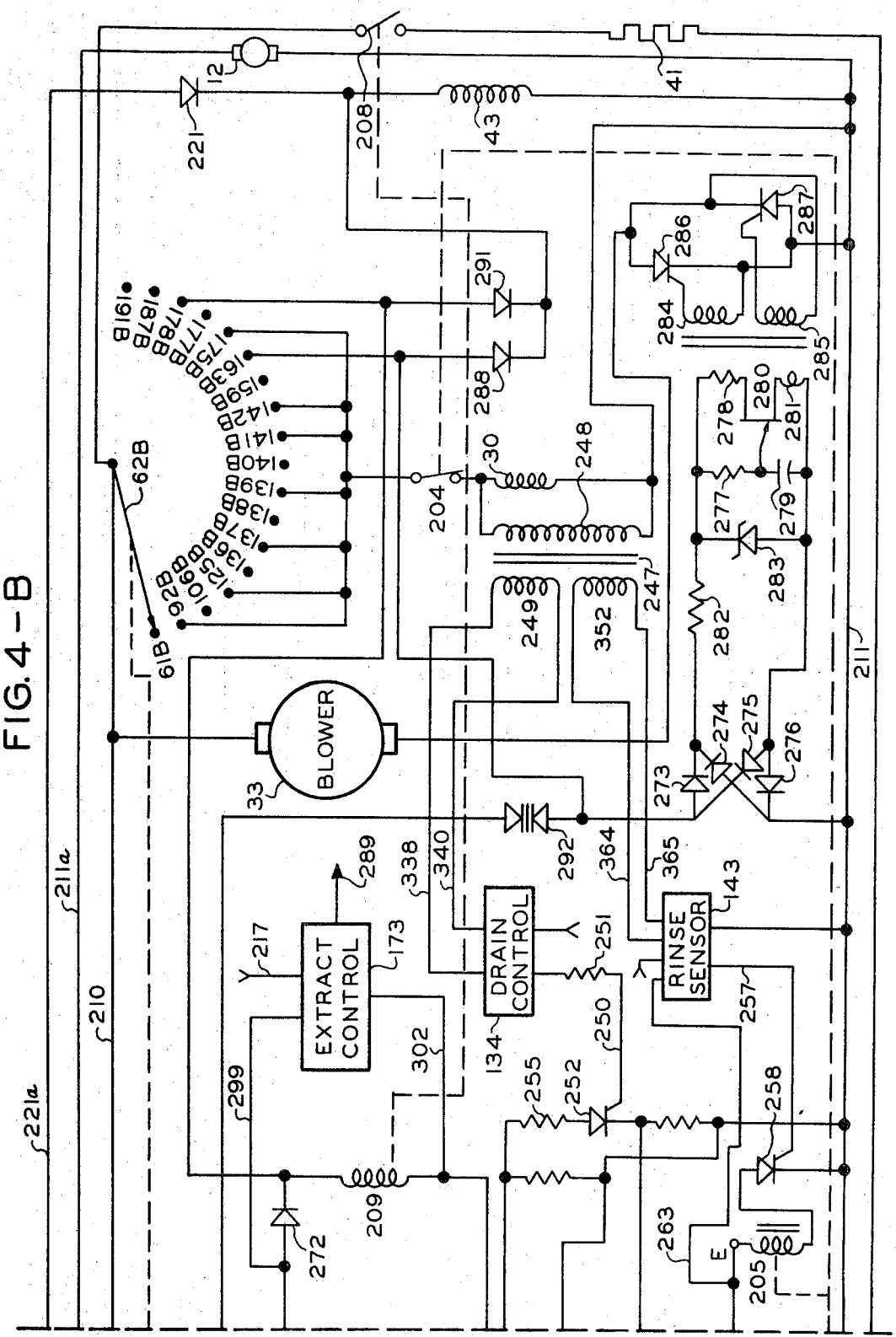
FIG.4-B

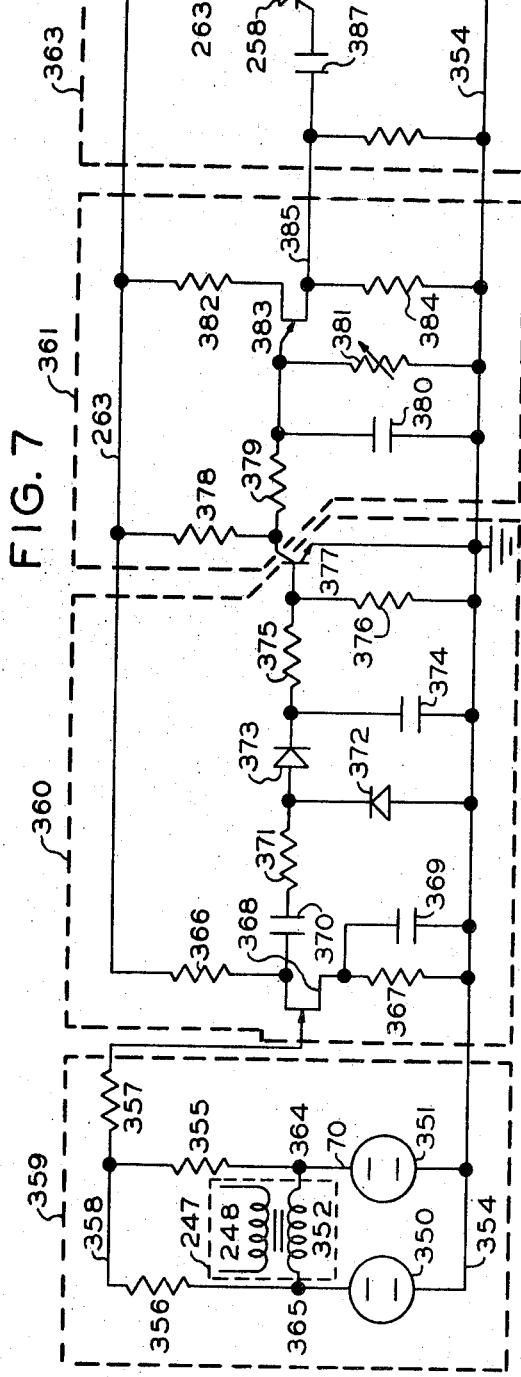
FIG. 7
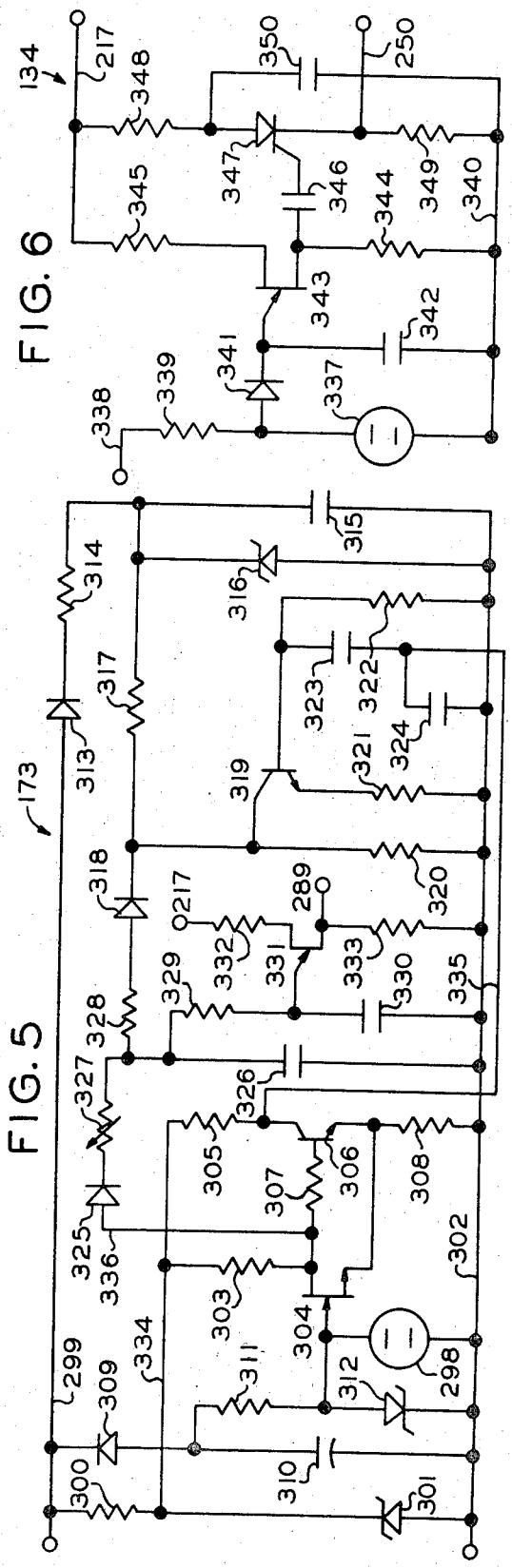
FIG. 6
FIG. 5

TOTAL SENSING COMBINATION WASHER-DRYER

RELATED APPLICATIONS

This application is a division of copending Application Serial No. 730,358, filed May 20, 1968 now Patent No. 3,575,193.

DISCUSSION OF PRIOR ART

Prior art control systems have employed mechanical timers for implementing cycle control in combination washer-dryers. While the fixed time method is satisfactory for controlling the duration of wash and rinse operations, problems arise when the duration of fill and drain steps is controlled on a time basis. For example, tap water pressures vary from one locale to another, thus causing fill levels attained during a fixed time duration fill operation to vary proportionately. Similarly, the time required to completely pump out a fluid filled chamber varies in proportion to the initial fill level and drain line suction. Since timer controlled fill levels are variable and drain line suction pressures differ from one laundry appliance to another, timer controlled drain steps are generally unnecessarily prolonged to assure complete drainage.

The cycle of operation in a typical timer controlled washer-dryer may include several deep rinse operations following the washing operation to insure that even the largest load is thoroughly rinsed. This, in the case of small loads, is unnecessary and leads to the use of excessive quantities of water.

Another problem attendant with prior art combination washer-driver controls arises during the extract operation. If the extract time is too short, a large load may enter the dry operation before sufficient water has been removed therefrom. If the dry operation is also timed, the result may be unduly wet clothing at the end of the dry operation. However, a light load may be in the extract step far longer than need be. This leads to unnecessary abuse of the clothing during extract. Also, the light load may be overdried during a timed dry operation which results in excessive linting of the clothing.

A further problem with time based control systems concerns the purge operation. If a hot water wash cycle is selected, water from the hot water line is flushed directly down the drain for a period of time to insure that all cold water has been purged from the hot water line. If the hot water supply line is short and purges quickly, a timed purge operation can lead to undue water usage. However, if the line is long, insufficient time may be allowed to purge it resulting in the use of cold water to wash clothing when hot water would be far more desirable.

SUMMARY

It can be readily appreciated that the problems discussed above stem from the exclusive use of time as a basis for sequentially controlling a cycle of operation. It can be further appreciated that a sequential control which would automatically terminate and initiate the sequential operations in a cycle of operation in response to sensed conditions would overcome the inherent disadvantages of prior art time-based controls.

It is thus a primary objective of this invention to provide a semielectronic control system for a combination washer-dryer which overcomes the above and other disadvantages attendant to prior art systems by employing condition responsive means to both initiate and terminate many of the laundering operations. The control basically comprises a solenoid actuated stepping switch, an RC timing circuit having a number of of selective delays, and a plurality of condition responsive circuits having sensing means associated therewith. As energization of the solenoid advances the stepping switch, each sequential switch position delivers power to a predetermined group of electromechanical components to actuate various machine functions and the machine is advanced through the operations comprising a complete cycle. During WASH and FLUSH RINSE operations, a selected delay in the RC timing circuit is energized by the stepping switch. Following this delay, the solenoid is energized thereby advancing the switch. Duration of PURGE, FILL, DEEP RINSE, DRAIN, CHECK SEPARATOR, EXTRACT, DRY and COOLDOWN operations is controlled by a selected, condition responsive circuit energized by the stepping switch when in a position corresponding to that operation.

In addition, the number of DEEP RINSE operations following the WASH operation is automatically controlled by condition responsive circuitry to assure that just enough DEEP RINSES are performed to rinse all soap and redeposited dirt from the clothing. Other features of the invention include a selector switch for initiating the machine at any step in its cycle of operation, a control for presetting the time duration of WASH, and a control for presetting the wash and rinse water temperature.

BRIEF DESCRIPTION OF THE DRAWINGS

Further objects and advantages of the present invention will be apparent from the following description, reference being had to the accompanying drawings, in which:

FIG. 3 is a block diagram of the semielectronic control system constructed in accordance with the teachings of this invention, FIGS. 4A and 4B show a schematic circuit diagram of the block diagram of FIG. 3, FIG. 5 is a schematic circuit diagram of the extract control employed in the circuit of FIG. 4B, FIG. 6 gives a schematic circuit diagram of the drain control employed in the circuit of FIG. 4B and FIG. 7 shows a schematic circuit diagram of the rinse sensor circuit employed in the circuit of FIG. 4B.

DESCRIPTION OF THE PREFERRED EMBODIMENT

Figure 1:
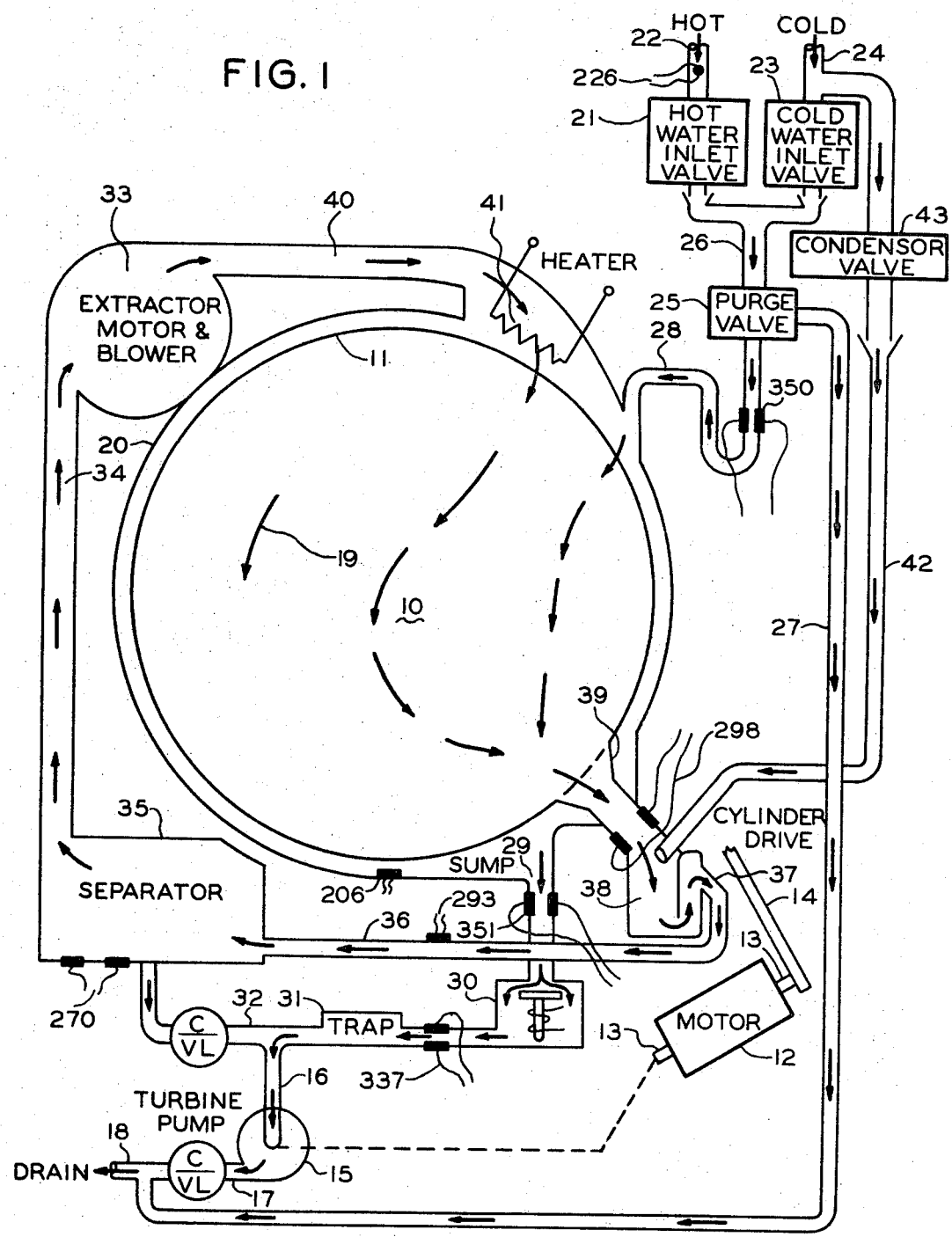
FIG. 1 is a diagrammatic view of a combination washer-dryer in which a preferred embodiment of the semielectronic control is employed.

FIG. 1 schematically shows the combination washer-dryer environment for the semi-electronic control system of this invention. The structure comprises a rotatable drum 10 having a perforate metal wall 11 journaled for rotation within a tub 20. Drum 10 is rotated in a counterclockwise direction by a motor 12 having a shaft 13 connected at one end to a belt system 14. The opposite end of shaft 13 is drivingly connected to a pump 15 provided with an inlet 16 and an outlet 17 leading to a drain conduit 18.

The apparatus is supplied with water through a hot water conduit 22 provided with a hot water inlet valve 21 and a cold water conduit 24 having a cold water inlet valve 23. Water from both inlet valve 21 and 23 flows into a purge valve 25 through a conduit 26. With valve 25 energized, water flowing through conduit 26 is diverted directly to conduit 18 through a bypass conduit 27. With valve 25 deenergized, water in conduit 26 is delivered to tub 20 through an inlet conduit 28.

At the bottom of tub 20 is a sump 29 having an exit controlled by a solenoid-operated drain valve 30 leading to a "button" trap 31 adapted to trap and remove small foreign objects from the exit liquid conduit. Trap 31 is connected to inlet 16 through a conduit 32.

The apparatus further includes a motor operated suction blower 33 having an inlet passage 34 connected to a fluid separator 35 for separating liquid from air. Separator 35 communicates via a passage 36 with a suds trap 37 and a condenser box 38 where suds are trapped and water vapor is condensed. Condenser box 38 in turn communicates with a nozzle 39 bearing against perforate wall 11 of drum 10.

Suction blower 33 has an outlet passage 40 which empties into tub 20 such that air passing therethrough enters drum 10 via perforate wall 11. Located in passage 40 is an electric heater 41.

Conduit 24 is provided with a branch conduit 42 leading to condenser box 38. A condenser valve 43 controls cold water flow through conduit 42. Water is introduced into condenser box 38 during the EXTRACT and DRY operations to vapor and also during the WASH step to aid suds trap 37 in trapping soap suds which might travel through passage 36 into separator 35.

Figure 2:
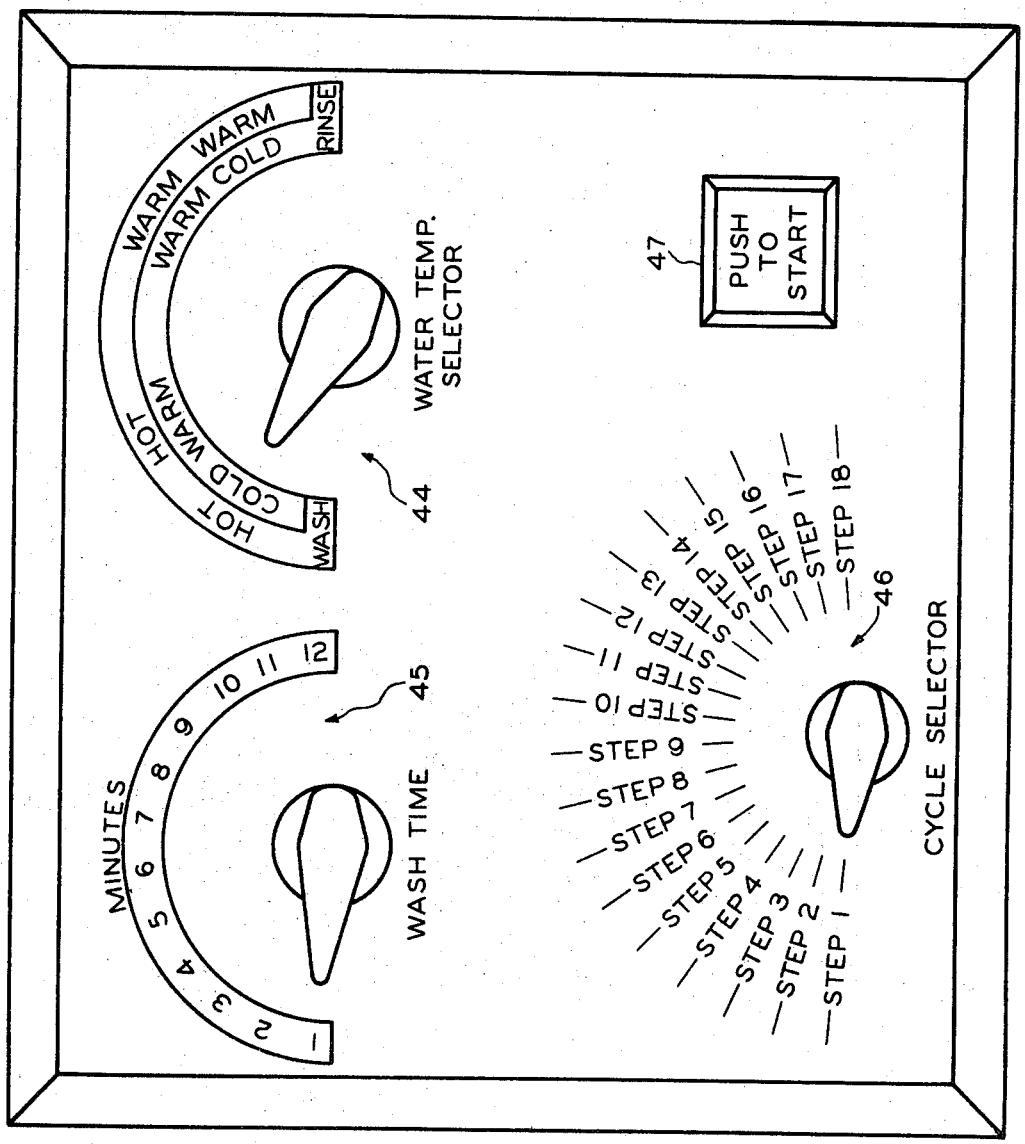
FIG. 2 is a fragmentary view of the control panel of a washer-dryer utilizing the control system of this invention.

FIG. 2 illustrates the controls used to program a cycle of operation for the combination washer-dryer of FIG. 1. A water temperature selector switch 44 allows simultaneous selection of the temperature of both rinse and wash water. A wash timer dial 45 is used to preset the duration of the WASH step from 1 to 12 minutes. A cycle selector 46 gives a visual readout of cycle progress at any moment and allows the operator to initiate the machine's cycle at any one of 18 discrete operations.

Assuming selector 44 is set for hot water wash and warm water rinse, dial 45 is set to give a twelve minute WASH period and cycle selector 46 is set at PURGE, FILL and WASH, a typical cycle of operation is as follows:

Upon pressing a push-to-start switch 47, inlet valve 21 and purge valve 25 are opened. Motor 12 is energized and drives drum 10, thereby imparting a tumbling motion to the clothes contained therein throughout the remainder of the machine's cycle. Purge valve 25 directs water entering inlet valve 21 directly out conduit 18, thereby purging cold water from conduit 22. When hot water begins to enter inlet valve 21, purge valve 25 closes and hot water flows into tub 20 through conduit 28. After tub 20 fills to a predetermined level, inlet valve 21 closes and the clothes are tumbled in drum 10 for a period of 12 minutes, as preset on dial 45. Throughout this WASH operation, cold water is delivered from conduit 24 through energized valve 43 and conduit 42 to condenser box 38. This enables suds trap 37 to prevent soap suds from travelling to separator 35 via condenser box 38 and passage 36.

After the 12 minute WASH step, the machine progresses to Step 2, FLUSH RINSE No. 1. During this step drain valve 30 opens allowing wash water to be pumped from tub 20 by pump 15. After most of the wash water has been pumped from tub 20, inlet valves 21 and 23 are opened while drain valve 30 remains open. This allows warm water to enter drum 10, thereby flushing soapy water and redeposited dirt from the clothing. This FLUSH RINSE step continues for approximately 5 minutes.

The machine next moves to Step 3, DEEP RINSE No. 1. During this step drain valve 30 closes while inlet valves 21 and 23 remain open, allowing the machine to fill with warm rinse water. At a predetermined level, inlet valves 21 and 23 close and the clothing is deep rinsed for 5 minutes in rotating drum 10. Following DEEP RINSE, the machine moves to Step 4, DRAIN, during which drain valve 30 opens and rinse water is pumped from tub 20 by pump 15. After all water has been removed, the cycle of operation progresses.

Note that Steps 3 and 4 taken together constitute a subcycle of DEEP RINSE followed by DRAIN. In the same manner, Steps 5, 7 and 9 are DEEP RINSE steps identical to Step 3 and Steps 6, 8 and 10 are DRAIN steps identical to Step 4. Thus, Steps 3 through 10 constitute a series of four identical subcycles of DEEP RINSE followed by DRAIN. However, four DEEP RINSE subcycles may not be necessary since all soapy water and redeposited dirt entrained by the clothing may be rinsed out after 1, 2 or 3 DEEP RINSE subcycles. If this is the case, the machine automatically advances to Step 11, FLUSH RINSE No. 2.

During FLUSH RINSE No. 2, inlet valve 21 and drain valve 30 are opened simultaneously to effect a second FLUSH RINSE step. Hot water only is used for this FLUSH RINSE to insure maximum water removal during Step 13, EXTRACTION, since hot water can be removed from the clothing more readily than cold water. After five minutes, Step 11 is terminated and both inlet valve 21 and drain valve 30 are closed.

During Step 12, CHECK SEPARATOR, the sequential control checks for the presence of soap suds in separator 35. If they were present, they could be sucked through passage 34 into suction blower 33 during Step 13, EXTRACT, and cause considerable machine damage.

Assuming no soap suds are present, the machine cycle proceeds to Step 13, EXTRACT. Heater 41 is energized and suction blower 33 is operated at high speed. Condenser valve 43 is also opened causing delivery of cold water to condenser box 38 via conduit 42. Suction blower 33 draws air heated by heater 41 at high velocity through perforate wall 11 of drum 10 into nozzle 39. This high velocity flow of heated air sucks water from the wet clothing as it falls against perforate wall 11 adjacent nozzle 39. This partially saturated air passes from nozzle 39 into condenser box 38 where some of its moisture is condensed. Next air flows through passage 36 into separator 35 where the condensed water is separated out. The air then returns to suction blower 33 through passage 34 and is forced on through passage 40 over heater 41 and into drum 10 once again. This step continues until sufficient water has been drawn from the clothing to make further EXTRACTION impractical.

The machine now advances to Step 14, DRAIN. Drain valve 30 opens and any water which has accumulated in separator 35 or sump 29 is pumped out conduit 18 by pump 15. When both sump 29 and separator 35 are empty, the cycle advances to Step 15, CHECK SEPARATOR. Again, the sequential control senses for the presence of soap suds in separator 35. If none are present, the machine moves to Step 16, DRY.

During Step 16, DRY, heater 41 is energized and suction blower 33 is energized at low speed. This gently draws heated air through the clothing in drum 10 and out through perforate wall 11 into nozzle 39. Energized condenser valve 43 admits cold water to condenser box 38 and water vapor is condensed from air drawn through nozzle 39. This air then passes through passage 36 into separator 35 where the condensed water is separated out. The air next is forced past heater 41 and back into drum 10. When the clothing is completely dry, the machine advances to Step 17, COOLDOWN. During this step the clothes are tumbled in drum 10 for a period of 5 minutes to insure they will be cool enough to be comfortably handled upon removal from the drum 10. The machine then advances to Step 18, OFF, and all machine functions are terminated.

FIG. 3 shows the logic diagram of a semielectronic control system capable of directing the combination washer-dryer through the sequence of steps described above. The logic diagram is comprised mainly of AND GATES, OR gates, and inverters. The function of these logic elements is well understood in the art and will not be described in detail. Suffice it to say that AND gates produce an output only when all inputs are energized, OR gates produce an output when any single input is energized, and inverters produce an output when no input is energized.

The following description covers a normal cycle of operation for the combination washer-dryer. Prior to cycle initiation, both push-to-start switch 47 and a door switch 48 are open. Setting selector 44 for a hot water wash and warm water rinse closes the switches 49, 50 and 51 and leaves the switch 52 open. Closing the machine's door closes door switch 48 after which the cycle may be initiated by manually closing push-to-start switch 47. This energizes one input to AND circuit 54 through a line 53 and supplies power via a line 55 to AND circuit 56 and a purge water temperature sensor circuit 57. Power is also supplied through a line 58 to motor 12 which rotates drum 10 and drives pump 15. A signal is further provided at one input of AND circuit 59, and one input of AND circuit 60, and a contact 61 on the stepping relay via a switch arm 62. From contact 61 on the stepping relay, a signal is transmitted along a line 63 to one input of OR circuit 64, one input of AND circuit 65, one input of AND circuit 66 and one input of OR circuit 67. A signal thus appears on a line 68 and condenser valve 43 is energized. This admits cold water to condenser 38 allowing suds trap 37 to prevent soap suds from entering separator 35 during the wash cycle.

Since no signal is present on a line 69, inverter 70 produces a signal on a line 71. This signal energizes preconditioned AND circuit 66 causing a signal to appear on a line 72 energizing OR circuit 73. The signal from OR circuit 73 is transmitted by a line 74 and switch 49 to OR circuit 75. Signal from OR circuit 75 is transferred via line 76 to inlet valve 21 and it opens. The signal from OR circuit 73 is also effective in preconditioning AND circuit 59 via a line 77. Since no signal is yet present on a line 78, inverter 79 has an output which appears on a line 80 and turns on preconditioned AND circuit 59. The resulting signal from AND circuit 59 opens purge valve 25 via a line 81. Thus, water entering the machine through inlet valve 21 flows directly to drain conduit 18 through purge valve 25 and conduit 27.

When sensor 57 detects warm water entering the machine, indicating that all cold water has been purged from conduit 22, it generates a signal on a line 82 which turns on preconditioned AND circuit 56. The signal now present on line 78 is fed back to line 82 via a line 83. This holds AND circuit 56 energized for the remainder of the cycle. The signal present on line 78 is also fed to inverter 79 and the signal on line 80 terminates. Thus, AND circuit 50 ceases to produce a signal on line 81 and purge valve 25 is deenergized. Hot water entering the machine now flows through inlet valve 21 directly into tub 20 through conduit 28.

When hot water in tub 20 reaches the proper level, fill sensor 84 generates a signal on line 69. This provides a signal to inverter circuit 70 and the signal which had been previously generated on line 71 terminates. Thus, AND circuit 66 ceases to provide a signal on line 72 causing OR circuit 73 to terminate its signal on line 74 which, in turn, de-energizes OR circuit 75 and inlet valve 21 opens.

The signal on line 69 also energizes preconditioned AND circuit 65 thereby producing a signal on a line 85 which initiates a time delay circuit 86. After twelve minutes as preset on dial 45, during which the combination is in the WASH portion of its cycle, time delay circuit 86 produces a signal on a line 87. This signal energizes OR circuit 88 thereby producing a signal on a line 89 which gates on preconditioned AND circuit 54. Output from AND circuit 54 is transmitted via a line 90 to a stepping mechanism 91. This mechanism moves arm 62 from contact 61 to a contact 92 and the WASH step is terminated.

A signal is now transmitted from arm 62 via contact 92 along a line 93 to OR circuit 94. Output from OR circuit 94 is next transferred via a line 95 and a switch 50 to OR circuit 96. The resultant signal on line 97 then opens inlet valve 23. The signal appearing on line 95 also energizes inlet valve 21 through switch 51, OR circuit 75 and line 76. With both inlet valves 21 and 23 open, warm water begins flushing into tub 20.

The signal on line 93 also energizes OR circuit 99 via a line 98. The output of energized OR circuit 99 then initiates a signal on line 100 which opens drain valve 30 and warm water flushing into tub 20 is thus pumped directly out drain conduit 18 by pump 15. This effects a flush rinse operation.

The signal on line 93 is further transferred to OR circuit 101 via a line 102. The resultant signal on a line 103 energizes a time delay circuit 104 which, after a period of seven minutes, generates a signal on a line 105. This signal feeds into OR circuit 88 causing arm 62 to transfer from contact 92 to contact 106. This will end the first FLUSH RINSE step.

A signal now appears on a line 107 thereby energizing OR circuit 108 whose signal travels via a line 109 and a line 110 to AND circuit 111. Note that since no signal is provided to inverter 112, there is an output on a line 113. This output is transferred along a line 114 and preconditioned AND circuit 111 generates an output signal. This signal is next transferred via a line 115 to AND circuit 116. Since tub 20 is empty at this time, full sensor 84 generates no signal on line 69; thus, inverter circuit 70 has no input and it produces a signal on line 71. This signal is transferred via a line 117 to preconditioned AND circuit 116 and it is energized. Its output is next transferred via a line 118 to OR circuit 94 and both inlet valves 21 and 23 are energized in the same manner as previously discussed. Warm water now flows into tub 20.

The signal on line 109 also travels via a line 119 to OR circuit 64 thereby energizing fill sensor 84. When tub 20 has filled to the proper level for the DEEP RINSE step, a signal is produced by fill sensor 84 on line 69 and inverter 70 terminates signal on line 71 which in turn causes AND circuit 116 to deenergize. Thus, the signal on line 118 ends and inlet valves 21 and 23 close. Tub 20 is now filled with warm water and a DEEP RINSE step is in progress.

The signal on line 69 produced by fill sensor 84 is also transferred along a line 120 to AND circuit 121. Since AND circuit 121 has been preconditioned for turn on by the signal on line 109, it produces a signal on a line 122. This signal initiates time delay 123 which, after a period of 5 minutes, generates a signal on a line 124. This signal is fed into OR circuit 88 thereby causing stepping mechanism 91 to move arm 62 from contact 106 to a contact 124. This terminates DEEP RINSE Step No. 1.

Signal is now transmitted from contact 125 to OR circuit 126 via a line 127. This results in a signal on a line 128 which is transferred via a line 130 to AND circuit 131. AND circuit 131 is thus preconditioned for turn on since there is already a signal present on line 113. Output from AND circuit 131 also energizes OR circuit 99 whose output energizes drain valve 30 via line 100.

The signal on line 128 also gates on OR circuit 132 whose output is transferred via a line 133 to a drain sensor 134. When drain sensor 134 senses tub 20 to be completely drained, it generates a signal on a line 135. This signal is transmitted to OR circuit 88 and stepping mechanism 91 is energized, moving arm 62 from contact 125 to a contact 136. This terminates Step 4, DRAIN.

Note that sequential energization of contacts 136 and 137 leads to the same series of events as sequential energization of contacts 106 and 125 respectively. Likewise contacts 138 and 139 correspond to contacts 106 and 125 as do contacts 140 and 141. From the description of events occurring with arm 62 at contacts 106 and 125 given above, it is apparent that sequential energization of contacts 106, 125, 136, 137, 138, 139, 140 and 141 causes the machine to go through a series of four DEEP RINSE - DRAIN cycles consisting of fill with rinse water, tumble for 5 minutes and drain.

However, for light loads, it may be desirable to only DEEP RINSE once. Or possibly, for slightly heavier loads, two to three deep rinse cycles may be all that are necessary. Since the number of DEEP RINSE cycles needed varies depending on load size and soil content, the control system of this invention has provision whereby, after sufficient cycles have been performed to rinse substantially all soapy water and redeposited dirt from the clothing, arm 62 is stepped directly to position 142. The means to effect this sensing and stepping operation is described next.

During the fill operation in Step 3 (Step 3 is in progress with arm 62 at contact 106), a sample of the clean rinse water is retained for a comparison with the water which will be drained from tub 20 during Step 4 (Step 4 is in progress when arm 62 is at contact 125). If the conductivities of the two samples are equal, all soap and redeposited dirt has been rinsed from the clothing. In a similar manner, samples of clean rinse water are kept during Steps 5, 7 and 9 (arm 62 at contacts 136, 138 and 140) and compared with rinse water drained from tub 20 during Steps 6, 8 and 10 (arm 62 at contacts 137, 139 and 141). Comparison of these samples is accomplished by a rinse sensor circuit 143 whose operation is now described.

During Steps 3, 5, 7 and 9, OR circuit 108 is energized and a signal appears on line 109 which is transferred via line 110 and a line 144 to OR circuit 145. Therefore, a signal appears on a line 146 preconditioning AND circuit 147. During Steps 4, 6, 8 and 10, OR circuit 126 is energized to produce a signal on line 128 which is transmitted along line 129 and a line 148 to OR circuit 145 thereby generating a signal on line 146. Thus, signal is present on line 146 throughout Steps 3 – 10.

During Steps 4, 6, 8 and 10 the signal on line 128 also travels on line 129 to rinse sensor 143. When rinse sensor 143 detects the conductivity of water used to fill the tub during Steps 3, 5, 7 and 9 is equal to that of water being drained from the tub during Steps 4, 6, 8 and 10, it produces a signal on a line 149. This signal is fed into preconditioned AND circuit 60 thereby producing a signal on a line 150 which feeds back via a line 151 to line 149. This locks AND circuit 60 continuously energized for the remainder of the cycle. The signal on line 150 also feeds preconditioned AND circuit 147 and it generates a signal which is transmitted to inverter 112 via a line 152, thus terminating the signal on line 113.

AND circuit 131 is now de-energized insuring that OR circuit 99 receives no input for whatever remains of Steps 3 – 10. This terminates the output of OR circuit 99 previously appearing on line 100 causing drain valve 30 to remain closed for the remainder of the Steps 3 – 10. The termination of signal on line 113 also deenergizes AND circuit 111 insuring that inlet valves 21 and 23 cannot be opened during the remainder of the Steps 3 – 10. The signal on line 152 is further fed via a line 153 to OR circuit 88 for whatever remains of Steps 3 – 10. Thus, stepping mechanism 91 advances arm 62 rapidly to Step 11, thereby terminating the DEEP RINSE cycles of the combination.

With arm 62 at a contact 142 (corresponding to Step 11) the signal now produced on a line 154 is transferred to OR circuit 73 via the lines 155 and 156. This energizes OR circuit 73 and inlet valve 21 opens. The signal on line 154 also travels via a line 157 to OR circuit 99 and drain valve 30 is energized via line 100. The machine is now in the second FLUSH RINSE step with hot water being flushed through the clothing and directly out drain conduit 18.

Line 154 also transfers a signal to OR circuit 101 via line 155 and a line 158. The output of OR circuit 101 on line 103 then initiates time delay 104. After 7 minutes a signal appears on line 105 and is transferred to OR circuit 88 thereby causing stepping mechanism 91 to move arm 62 from contact 142 to a contact 159. This ends the second FLUSH RINSE step.

The machine now moves to the EXTRACT step during which moisture is "sucked" from the clothing via high velocity heated air drawn through perforated wall 11 of drum 10. However, since the high velocity air drawn from drum 10 must pass through separator 35 during Step 13 (EXTRACT), the separator must be checked to insure that no soap suds are present which could be drawn into suction blower 33, thereby damaging its mechanism. A signal is thus transferred from contact 159 on a line 160 to a separator drain sensor 161. If there are no soap suds present in separator 35, a signal appears on a line 162 and OR circuit 88 energizes stepping mechanism 91. This immediately advances arm 62 from contact 159 to a contact 163.

The machine is now in the EXTRACT operation. During this step, signal present at contact 163 travels along the lines 164 and 165 to OR circuit 166 whose output feeds into a heater relay 167. This energizes heater 41 which heats air passing through drum 10. The signal on line 164 also energizes a high speed blower control 168 through a line 169. Control 168 then feeds modulated power to OR circuit 170 whose output travels via a line 171 to suction blower 33, thereby causing its operation at high speed. The signal on line 169 is further transmitted to OR circuit 67 whose output energizes condenser valve 43 via line 68. Therefore, during this step, heated air is drawn at high speed through perforate wall 11 of drum 10. This air draws moisture from the clothing as it is sucked therethrough. Moisture is then condensed and separated from the moisture laden air during its subsequent passage through condenser box 38 and separator 35.

Signal on line 164 is also transferred through a line 172 to an extract sensor 173. When sensor 173 senses the amount of moisture being extracted from the clothing is minimal, a signal is generated on a line 174 to energize OR circuit 88. This actuates stepping mechanism 91 which transfers arm 62 from contact 163 to a contact 175.

The final DRY operation will commence shortly. However, first drain valve 30 is opened to insure that all water removed from the clothing during the EXTRACT operation is pumped out drain conduit 18. To effect this, a signal placed on a line 176 by contact 175 is transferred to OR circuit 99 through a line 176a, thereby opening drain valve 30. This allows any water present in separator 35 to be pumped from the machine. The signal on line 176 also goes to OR circuit 132 producing a signal on line 133 which activates drain sensor 134. When sensor 134 detects that no more water is passing through drain conduit 18, a signal is produced on line 135. This signal actuates OR circuit 88 and stepping mechanism 91 transfers arm 62 from contact 175 to a contact 177.

The machine is now in Step 15, CHECK SEPARATOR, wherein separator 35 is again checked for the presence of soap suds. Output from contact 177 is transferred along line 160 to sensor 161. If no soap suds are present in separator 35, a signal travels on line 162 to OR circuit 88 and stepping mechanism 91 moves arm 62 from contact 177 to a contact 178.

The DRY operation is now in progress during which time the signal present on a line 179 is transferred along a line 180 to OR circuit 166. OR circuit 166 again actuates heater relay 167 and heater 41 is energized. The signal on line 180 also energizes OR circuit 181a which in turn energizes low speed blower control 181. The output of control 181 is then fed to OR circuit 170 causing actuation of suction blower 33 at low speed. Warm air is now being gently drawn through the tumbling load of clothing. To separate water from the air passed through the wet clothing, signal on line 179 is also transferred on a line 182 to OR circuit 67 whose output on line 68 actuates condenser valve 43.

Termination of the DRY operation is controlled by a dry sensor 183 receiving signal from line 180. When sensor 183 senses the clothing in drum 10 to be nearly dry, it produces a signal on a line 184 which feeds into a 7 minute time delay 185. This time delay insures that the clothes are completely dry. After the 7 minute time period, delay 185 produces a signal on a line 186 which energizes OR circuit 88 thereby energizing stepping mechanism 91. This moves arm 62 from contact 178 to a contact 187.

Step 17 is A COOLDOWN operation. A signal is transferred from contact 187 via the lines 188 and 188b to OR circuit 181a. Output from OR circuit 181a then energizes control 181 which operates blower motor 33 at low speed. This draws cool air gently through the clothes since heater 41 is not energized during this step. A signal is also transferred along a line 188a into time delay 189. After a period of five minutes, delay 189 produces a signal on a line 190 to energize OR circuit 88. This actuates stepping mechanism 91 thereby moving arm 62 from contact 187 to a contact 191. Contact 191 actuates a mechanism 192 which opens push-to-start switch 47 and the machine cycle of operation is terminated.

In the semielectronic sequential control system just described, note that all the electromechanical actuating components of the machine shown on the right of FIG. 3 (i.e., water valves 21 and 23 purge valve 25, blower motor 33, condenser valve 43, drain valve 30, heater relay 167 and motor 12) are energized and deenergized in a predetermined sequence in response to sensor circuitry such as purge water temperature sensor 57, fill sensor 84, drain sensor 134, rinse sensor 143, extract sensor 173, dry sensor 183, and separator drain sensor 161. While various time delays also exert a certain degree of control, their role is a more passive one since their operation is initiated for the most part by the various sensor circuits. This mode of operation completely eliminates the guess work inherent in sequential controls based on time and assures optimum machine functioning independent of such variables as water pressure, drain line suction, load size, soil content, etc.

Turning now to the detailed circuit of FIGS. 4A and 4B which is capable of performing the sequence of logic operations defined by the block diagram on FIG. 3, a normal cycle of operation will be described. As before, assume hot water wash and warm water rinse are selected on selector 44. This closes the gang-connected switches 194 and 195 while switch 193 remains open. Prior to initiation of the cycle, the condition of all other switches in the circuit is as follows:

A relay-operated switch 197 is open and a single-pole, double-throw relay operated switch 198 has a movable contact 199 in communication with a stationary contact 201. The switches 202 and 204, operated by a deep rinse cancel relay 205, are closed while a switch 203, also operated by relay 205, remains open. A pressure switch 206 is closed since tub 20 is empty at cycle initiation. A stepping relay break switch 207 is closed and a switch 208, operated by heater relay 167, is open. Assuming the operator has set a dial 45 for a 12-minute wash operation, the full resistance value of a potentiometer 210a is in the circuit. A pair of stepping relay switch arms 62a and 62b are set at contacts 61a and 61b respectively.

Machine operation is initiated by closing the combination washer-dryer door, which closes switch 48, and then manually closing push-to-start switch 47. Power is now supplied on main power busses 210 and 211a and Step 1 commences. Motor 12, connected between buss 211a and a line 211 is energized to effect continuous rotation of drum 10 throughout the remainder of the machine's operating cycle. Motor 12 also drives pump 15.

A.C. power on buss 210 further energizes a half-wave Zener diode regulated power supply consisting of diode 212, capacitor 214, resistors 213, 215 and Zener diode 216. This supply maintains a constant D.C. potential of 25 volts on a line 217.

Valve 21 is energized from buss 210 through arm 62a, contact 61a, diode 218, switch 194, diode 219a, switch 198, and pressure switch 206. Water thus flows from conduit 22 (see FIG. 1) to purge valve 25 which is energized from line 210 through diode 220, switch 198 and pressure switch 206. With valve 25 thus open, all water passing through valve 21 is diverted directly out conduit 18.

Condenser valve 43 is also energized through arm 62a, contact 61a, line 221a and diode 221. This admits cold water to condenser box 38 thereby preventing soap suds from traveling into separator 35 which might cause machine damage later in the cycle were they to be sucked into blower 33 during an EXTRACT or DRY step.

Half-wave rectified A.C. is delivered to point 222 via arm 62a, contact 61a, resistor 210b, wash-timing potentiometer 210a and diode 223. This rectified A.C. will be utilized later in Step 1 to charge a capacitor 224 through a diode 225. However, as long as tub 20 is empty, pressure switch 206 remains closed and the rectified A.C. at point 222 is shorted to ground.

A negative temperature coefficient thermister 226 is located in conduit 22 immediately prior to its entry into inlet valve 21. After all cold water has been purged from conduit 22, hot water entering the machine heats thermister 226 and its resistance drops, thereby allowing capacitor 227 to charge from the source of D.C. potential on line 217. Upon attaining a specified voltage level, capacitor 224 fires a unijunction transistor 228. The voltage pulse thus generated across resistor 228a is transmitted to the gate electrode of thyristor 229 through diode 230. Turn on of thyristor 229 energizes purge relay 196 from buss 211a through switch 47 and thyristor 229. Relay 196 closes switch 197 which, in series with diode 231, parallels the initial conductive path established by thyristor 229. Therefore, once relay 196 is energized, it maintains itself through switch 47, its own switch 197 and diode 231. Note that the machine door may be opened, thereby opening door switch 48, without de-energizing relay 196. This insures that the purge operation will not be repeated once it has been completed at the beginning of Step 1. Energized relay 196 also moves contact 199 into communication with contact 200 on switch 198 thereby opening the energization path for valve 25 and it de-energizes. However, valve 21 remains energized through a diode 219. Thus, hot water flowing through valve 21 is no longer diverted to conduit 18 and tub 20 begins to fill.

When tub 20 is full, pressure switch 206 opens, thus breaking the energization path for valve 21. The fill operation is now complete. The opening of pressure switch 206 also removes the short to ground from point 222 and the rectified A.C. at point 222 begins to charge capacitor 224 through diode 225. While the voltage level on capacitor 224 rises, the combination washer-dryer performs the WASH operation. After a 12-minute period, as preset using potentiometer 210a, the voltage level on capacitor 224 reaches 70 volts and a neon lamp 232 ionizes. Charge on capacitor 224 now passes to the gate electrode of thyristor 233 through resistor 234 thereby rendering it conductive. Current is now conducted from line 210 through diode 236, resistor 235, break contact 207 and thyristor 233 to a stepping relay motor 237. Motor 237 initiates mechanical advancement of arms 62a and 62b to contacts 92a and 92b respectively. As the arms move, contact 207 breaks momentarily, thus terminating power to thyristor 233 and it goes out of conduction. This, of course, de-energizes motor 237. However, once arms 62a and 62b begin their mechanical advancement from contacts 61a and 61b to contacts 92a and 92b respectively, they will complete this advancement. It should also be noted that when thyristor 233 goes into conduction it shorts all charge on capacitor 224 to ground through diode 238 and thyristor 233. This ends Step 1.

With arms 62a and 62b at contacts 92a and 92b respectively, Step 2 (FLUSH RINSE No. 1) commences. First drain valve 30 is energized from line 210 through arm 62b, contact 92b and switch 204. Thus, water in tub 20, as well as any water entering via valves 21 and/or 23 during this step, is pumped from the machine by pump 15. After substantially all wash water has been expelled from tub 20, pressure switch 206 closes and valve 21 is energized through arm 62a, contact 92a, series connected diodes 239 and 240, switch 195, diode 219, switch 198 and pressure switch 206. Valve 23 is also energized via arm 62a, contact 92a, diode 239, switch 198 and pressure switch 206. Hence warm water (a mixture of water from both hot and cold inlet valves) flushes through tub 20 and is pumped to open drain conduit 18. This flush and rain operation constitutes the FLUSH RINSE Step.

During this step half-wave rectified A.C. is provided at point 241 via arm 62a, contact 92a, diodes 239 and 242 and timing resistor 243. This half-wave rectified A.C. charges capacitor 224 to 70 volts in approximately seven minutes whereupon motor 237 is energized as described previously. Arms 62a and 62b now advance to contacts 106a and 106b respectively. Step 2 (FLUSH RINSE No. 1) is now terminated as step 3 (DEEP RINSE No. 1) begins.

Valve 21 is now energized from line 210 through arm 62a, contact 106a, switch 202, diode 244, diode 240, switch 195, diode 219, switch 198 and pressure switch 206. Valve 23 is energized via arm 62a, contact 106a, switch 202, diode 244, switch 198 and pressure switch 206. After tub 20 fills with warm rinse water, pressure switch 206 opens thereby closing valves 21 and 23. The clothing is now being rinsed in warm water within rotating drum 10.

During this step, a timing circuit is activated as follows: Point 222 is provided with half-wave rectified A.C. via arm 62a, contact 106a, timing resistor 245 and diode 246. Once pressure switch 206 opens, this half-wave rectified A.C. charges capacitor 224 to 70 volts in approximately 5 minutes, at which time neon lamp 232 ionizes. Motor 237 is again energized as herebefore described and arms 62a and 62b move to contacts 125a and 125b respectively. Step No. 4 (DRAIN) is now initiated as Step No. 3 (DEEP RINSE) ends.

Drain valve 30 is energized from line 210 through arm 62b, contact 125b and switch 204. Thus rinse water is drained from tub 20 by pump 15. In order to terminate the DRAIN step when the water in tub 20 is completely expelled, the primary 248 of a transformer 247 is connected in parallel with drain valve 30. Power transferred to a first secondary 249 of transformer 247 energizes a drain control circuit 134. The operation of this circuit will be explained in detail later in this disclosure. For now, suffice it to say that drain control 134 detects an absence of water passing through drain conduit 18. At that time it generates a pulse on line 250 which is transmitted to the gate electrode of a thyristor through resistor 251. Thus, thyristor 252 fires and power is supplied to the gate electrode of thyristor 233 from line 210 through arm 62a, contact 125a, diode 253, resistors 254 and 255, thyristor 252, and resistor 256. Thyristor 233 now energizes motor 237 and arms 62a and 62b advance to contacts 136a and 136b respectively, thereby ending Step 4 (DRAIN).

The machine is now in Step 5 (DEEP RINSE). This Step is identical to Step 3 except arms 62a and 62b are at contacts 136a and 136b respectively. Thus, after a DEEP RINSE Step identical to Step 3, motor 237 advances arms 62a and 62b to contacts 137a and 137b respectively. The machine is now in Step 6 (DRAIN). This step is similar to Step 4 except arms 62a and 62b are now at contacts 137a and 137b respectively. At the termination of this step, arms 62a and 62b are advanced to contacts 138a and 138b respectively. The machine now enters Step 7 (DEEP RINSE), which is a duplicate of Step 3. After finishing Step 7 (DEEP RINSE), arms 62a and 62b are transferred to contacts 139a and 139b respectively. The machine is now in Step 8, which is a DRAIN Step precisely like Step 4. Step 8 is terminated as described with regard to Step 4 and arms 62a and 62b move to contacts 140a and 140b respectively. The machine is now in Step 9 or the fourth DEEP RINSE Step. As before, this step is exactly like Step 3. After termination of this Step, arms 62a and 62b are advanced to contacts 141a and 141b respectively. The machine is now in Step 10 (DRAIN), which is identical to Step 4.

From the preceding paragraph, it is apparent that Steps 3 through 10 comprise a series of four identical cycles of DEEP RINSE followed by DRAIN. However, it may not be necessary to DEEP RINSE the laundered clothing 4 times in order to remove all soapy water and redeposited dirt trapped therein. Thus, a deep rinse cancel circuit is provided to terminate the DEEP RINSE operations after a sufficient number have been performed. Its operation is now described.

During Steps 3, 5, 7 and 9 (DEEP RINSE Steps), power is provided to the deep rinse cancel circuit via arms 62a, the appropriate one of contacts 106a, 136a, 138a or 140a and diode 255. During steps 4, 6, 8 and 10 (DRAIN Steps) power is supplied to the deep rinse cancel circuit through switch arm 62a, the appropriate one of contacts 125a, 137a, 139a or 141a and diode 256. The deep rinse cancel circuit performs no function until a rinse sensor circuit 143 (whose detailed operation will be described later) provides a pulse on a line 257. Generally, said pulse is produced when circuit 143 senses that the conductivity of water being drained after a DEEP RINSE Step is equal to the conductivity of clear rinse water added to tub 20 prior to each DEEP RINSE Step. Equal conductivity of these two samples indicates that the rinse water did not pick up appreciable soap and dirt from the clothing during DEEP RINSE; thus, nearly all residue must be rinsed out at this point. When the pulse appears on line 257, thyristor 258 is fired which connects relay 205 to ground.

Power to energize relay 205 is provided by a half-wave, Zener regulated power supply consisting of diode 255 or 256, resistors 259 and 260, capacitor 261 and Zener diode 262. This supply provides a D.C. potential of 25 volts on line 263 throughout Steps 3 through 10. Thus, once thyristor 258 is gated on, it remains conductive until arms 62a and 62b are advanced to contacts 142a and 142b, at which time the source of power to the Zener regulated power supply is eliminated. Energizing of relay 205 also opens switches 202 and 204 thereby terminating power to valves 21, 23 and 30 during whatever remains of Steps 3 through 10. Energized relay 205 also closes switch 203 which completes a path from switch contacts 106a, 125a, 136a, 137a, 138a, 139a, 140a, 141a and 142a through either diode 255 or 256, resistor 264, diode 265 and switch 203 to point 241. The power applied at point 241 repeatedly charges capacitor 224 rapidly to 70 volts to advance arms 62a and 62b, a step at a time, to contacts 142a and 142b. Since power is removed from valves 21, 23 and 30, they do not energize momentarily as arms 62a and 62b advance from whatever position they are in to contacts 142a and 142b. Note that if all four DEEP RINSE Steps are needed, as determined by rinse sensor circuit 143, the deep rinse cancel circuit is never activated.

Once arms 62a and 62b advance to contacts 142a and 142b, the machine is in step 11 (FLUSH RINSE). During this step, inlet valve 21 is energized from line 210 through arm 62a, contact 142a, diode 266, switch 194, diode 219, switch 198 and pressure switch 206.

Thus, hot water flows into tub 20 during Step 11. Drain valve 30 is also energized through arm 62b, contact 142b, and switch 204. This insures that hot water flushing through tub 20 is pumped out conduit 18 by pump 15.

During this step, half-wave rectified A.C. power is provided at point 241 via arm 62a, contact 142a, diodes 267 and 242 and resistor 243. This power charges capacitor 224 to 70 volts in approximately 5 minutes. Neon lamp 232 then ionizes causing advancement of arms 62a and 62b to contacts 159a and 159b respectively. This terminates Step 11 (FLUSH RINSE) and the machine is now in Step 12 (CHECK SEPARATOR).

During this step, power is supplied from line 210 to a point 268 through arm 62a, contact 159a and resistor 269. If a separator drain sensor 270 (which consists of two metal electrodes electrically isolated from each other and located in the bottom of separator 35) is shorted by soap suds in separator 35, power at point 268 is shorted to ground and the cycle stops until the soap suds dissipate. If sensor 270 appears as an open circuit, indicating no soap suds in separator 35, diode 271 conducts half-wave rectified A.C. to point 241 and capacitor 224 charges quickly to 70 volts, thereby initiating cycle advancement. Thus, arms 62a and 62b move to contacts 163a and 163b respectively. This ends Step 12 (CHECK SEPARATOR).

Now, the machine is in Step 13 (EXTRACT) during which relay 167 is energized from line 210 through arm 62a, contact 163a and diode 272. Switch 208 thus closes and heater 41 is energized.

Arm 62b conducts power from line 210 through contact 163b to a motor speed control circuit which powers blower 33. The speed control circuit comprises a full-wave bridge, made up of diodes 273, 274, 275 and 276, which supply full-wave rectified power to a unijunction transistor relaxation oscillator composes of resistors 277 and 278, capacitor 279, a unijunction transistor 280 and pulse transformer primary 281. To limit voltage to the unijunction oscillator, resistor 282 and Zener diode 283 are provided to clip the rectified A.C. delivered from the full-wave bridge. Early in each A.C. line cycle, capacitor 279 charges up and fires transistor 280. This pulses current through transformer primary 281 which then transmits a firing pulse to transformer secondaries 284 and 285. Thus, a thyristor 286 is fired on positive line cycles and a thyristor 287 is fired on negative line cycles. The power passing through thyristors 286 and 287 energizes blower 33 at high speed and it draws heated air through drum 10 creating a suction at the periphery thereof.

Condenser valve 43 is powered from line 210 through arm 62b, contact 163b and diode 288. Thus, cold water is supplied to condenser 38 enabling it to condense moisture from the partially saturated air drawn from the clothing during the EXTRACT Step.

An extract control 173 (to be described in detail later) is powered through arm 62a and contact 163a. When it senses that insufficient water is being removed from the clothing to justify continuation of the EXTRACT Step, it produces a pulse on line 289 which passes to the gate electrode of thyristor 233 through a diode 290. Thyristor 233 fires and energizes motor 237. Thus, arms 62a and 62b advance to contacts 175a and 175b respectively. This terminates Step 13 (EXTRACT) and initiates Step 14 (DRAIN).

This step proceeds in identical manner to DRAIN Step 4 except arms 62a and 62b are now at contacts 175a and 175b respectively. When drain control 134 senses the drain operation to be complete, arms 62a and 62b are advanced to contacts 177a and 177b. Step 14 (DRAIN) is now terminated and the machine moves on to Step 15 (CHECK SEPARATOR). Separator 35 is checked during this step for the presence of soap suds in exactly the same manner as during Step 12. If no suds are detected, motor 237 again is energized and arms 62a and 62b advance on to contacts 178a and 178b. The machine now is in Step 16 (DRY).

During this step, relay 167 is energized from buss 210 through arm 62b and contact 178b. This closes switch 208 and heater 41 is energized. Arm 62b also transmits power through contact 178b and diode 291 to condenser valve 43 causing cold water to enter condenser box 38, thus enabling it to condense water vapor from partially saturated air drawn through the clothing during the DRY Step.

Arm 62a powers the motor speed control circuit via contact 178a and unilateral breakover diode 292. Due to the operating characteristics of diode 292, power applied to the speed control circuit during each half cycle is delayed until diode 292 goes into conduction. Hence, thyristors 286 and 287 fire later in each positive and negative half cycle. This reduces the power supplied to blower 33 and it runs at a slower speed than during Step 13 (EXTRACT). Blower 33 gently draws heated air over the clothing to effect drying.

As the clothing begins to dry, the temperature of air passing through passage 36 (see FIG. 1) begins to rise. At a predetermined temperature, thermostat 293 located in passage 36 closes. Thus, half-wave rectified A.C. is transmitted to point 241 through arm 62a, contact 178a, thermostat 293, diode 294 and resistor 295. Capacitor 224 now charges to 70 volts in approximately 7 minutes, at which time neon lamp 232 ionizes and motor 237 advances arms 62a and 62b to contacts 187a and 187b.

The machine is now in Step 17 (COOL DOWN). During this step, power is supplied from buss 210 through arm 62a, contact 187a and diode 292a to diode 292. Thus, blower 33 is energized at low speed as in Step 16 and gently draw cool air through the clothing load to effect a COOL DOWN operation. Half-wave rectified A.C. power is provided at point 241 through arm 62a, contact 187a, diode 296 and resistor 297. This charges capacitor 224 to 70 volts in approximately 5 minutes and motor 237 advances arms 62a and 62b to contacts 191a and 191b respectively.

The machine is now in Step 18 (OFF). During this step power from line 210 is conducted to a relay coil 255a through arm 62a and contact 191a. Coil 255a acts through a linkage 255b to open push-to-start switch 47. At this time, power to all machine components is terminated and the cycle of operation is complete.

Referring now to FIG. 5, the operation of extract control 173 will be covered. It will be remembered from the description of FIG. 4 that extract control 173 generates a pulse on line 289 when insufficient water is being removed from the clothing to justify continuation of Step 13 (EXTRACT). To sense this condition, an extract sensor 298 is provided in the passage through which partially saturated air is drawn during the EXTRACT Step. Sensor 298 consists of two electrodes electrically isolated from each other as shown diagrammatically in FIG. 1. At initiation of the EXTRACT Step, resistance between the electrodes of sensor 298 is low due to the passage of highly saturated air. As the clothes begin to dry, the water vapor content of air drawn through perforate wall 11 of drum 10 drops and resistance between the electrodes of sensor 298 rises correspondingly. When the resistance is sufficiently high, a pulse is generated on line 289.

Extract control 173 is energized by AC power supplied from line 299 and 302 during Step 13. A resistor 300 is connected between line 299 and the cathode of a Zener diode 301 whose anode is in turn connected to line 302. A resistor 303 is connected from the cathode of diode 301 to the source electrode of a field effect transistor 304. A resistor 305 connects the cathode of diode 301 to the collector of a transistor 306. A resistor 307 ties the source electrode of transistor 304 to the base electrode of transistor 306. The drain electrode of transistor 304 and the emitter electrode of transistor 306 are connected to a resistor 308 which in turn connects to line 302. Connection of transistors 304 and 306 in this manner forms a Schmitt trigger circuit well-known in the prior art. This circuit is energized by half-wave rectified voltage clipped at the Zener voltage of diode 301.

Input to the trigger circuit is provided at the gate electrode of transistor 304 by the following circuit: Connected between line 302 and the anode of diode 309 is a capacitor 310. The cathode of diode 309 returns to line 299. A resistor 311 is connected from the anode of diode 309 to the anode of a Zener diode 312, the gate electrode of transistor 304 and one electrode of sensor 298. Both the cathode of diode 312 and the opposite electrode of sensor 298 connect to line 302. This circuitry provides an input signal to the trigger circuitry varying in direct proportion to the resistance of sensor 298.

A diode 313 is connected between line 299 and resistor 314 whose opposite terminal is connected to the common connection of a capacitor 315 and the cathode of a Zener diode 316. The anode of diode 316 and the second terminal of capacitor 315 are connected to line 302. A resistor 317 is connected from the cathode of diode 316 to the cathode of diode 318, the collector of transistor 319 and one lead of resistor 320 whose opposite lead connects to line 302. A resistor 321 ties the emitter electrode of transistor 319 to line 302. A further resistor 322 is connected between the base electrode of transistor 319 and line 302. Series connected capacitors 323 and 324 are connected from the base electrode of transistor 319 to line 302. The connection point between capacitors 323 and 324 is tied to the collector of transistor 306. This circuitry provides a power supply and biasing network for transistor 319 whose conductive state is dependent upon the saturation of transistor 306.

A diode 325 is connected between the source electrode of transistor 304 and one lead of potentiometer 327 whose other lead ties to capacitor 326. The other side of capacitor 326 is connected to line 302. A resistor 328 connects the anode of diode 318 to the connection point of potentiometer 327 and capacitor 326.

A further resistor 329 connects the common leads of potentiometer 327 and capacitor 326 to one lead of a capacitor 330 and the emitter electrode of a unijunction transistor 331. The other lead of capacitor 330 is connected to ground. A resistor 332 connects line 217 (see FIG. 4) to the base 1 electrode of transistor 331. A resistor 333 ties the base 2 electrode of transistor 331 to ground. This circuitry comprises a unijunction transistor relaxation oscillator whose charging current is supplied from capacitor 326.

Assuming the EXTRACT Step has just begun, sensor 298 appears as a short circuit. Therefore, transistor 304 is biased on, since the voltage between its gate and drain electrodes is held essentially at 0 volts. The clipped, half-wave A.C. appearing on line 334 is thus shorted to line 302 through resistors 303 and 308, and transistor 304. Saturated transistor 304 also shunts base current away from transistor 306. Therefore, transistor 306 remains biased off. With transistor 306 off, the voltage on a line 335 is high and transistor 319 saturates each time the clipped, half-wave voltage appears on line 334. Thus, no charge builds up on capacitor 326 since it is shunted to line 302 via resistor 328, diode 318, transistor 319 and resistor 321. Also note that with transistor 304 saturated, the voltage on line 336 is low. Therefore, no voltage is available to charge capacitor 326 through diode 325 and potentiometer 327.

As the clothes in tumbling drum 10 begin to dry, the resistance between electrodes of extract sensor 298 increases. As it does increase, the voltage rises from the drain to the gate of transistor 304 and it begins to shut off. Base current now flows to transistor 306 and it begins to saturate. As it does, the current passing through resistor 308 raises the voltage at the drain of transistor 304. This biases transistor 304 completely off, thereby raising the voltage on line 336. A voltage source is now available to charge capacitor 326 through diode 325 and potentiometer 327. Also, with transistor 306 in saturation, transistor 319 receives no base signal and it cuts off. Capacitor 326 now charges, which in turn charges capacitor 330 through resistor 329. When the voltage level across capacitor 330 reaches the breakdown voltage of transistor 331, it fires and capacitor 330 discharges through resistor 333. A pulse now appears on line 289 which will be utilized by the circuit in FIG. 4 to step the sequential control out of Step 13 (EXTRACT).

Shown in FIG. 6 is a circuit schematic of drain control 134. Power is made available to drain control 134 through transformer 247, (see FIG. 4) whose primary 248 is connected in parallel with valve 30. This insures that drain control 134 is energized during all DRAIN operations. A line 338 connects transformer secondary 249 (see FIG. 4) to one lead of resistor 339 whose other lead connects to one electrode of drain sensor 337. The other electrode of sensor 337 is connected to a line 340. Drain sensor 337, as shown diagrammatically in FIG. 1, consists of two conductive electrodes electrically isolated from each other and located in drain conduit 18. Water passing through drain conduit 18 shorts the electrodes together. When the drain operation is complete, water is no longer present between electrodes and the resistance therebetween rises appreciably to signal completion of the DRAIN Step.

Tied to the connection point of resistor 339 and sensor 337 is the anode of a diode 341. The cathode of diode 341 connects to one lead of capacitor 342 and the emitter electrode of a unijunction transistor 343. The other lead of capacitor 342 connects to line 340. Connected between the base 2 electrode of transistor 343 and line 340 is resistor 344. Transistor 343 is provided with a DC potential of 25 volts through resistor 345 connected between line 217 and the base 1 electrode of transistor 343. A capacitor 346 ties the base 2 electrode of transistor 343 and the gate electrode of thyristor 347 together. Thyristor 347 is also provided with DC power from line 217 through resistor 348. A further resistor 349 is connected between the cathode of thyristor 347 and line 340. Connected in parallel with series connected thyristor 347 and resistor 349 is a capacitor 350. Also connected to the cathode of thyristor 347 is a line 250 on which will appear the pulse signalling termination of the drain operation.

The operation of drain control 134 is as follows: Assuming water is present in the drain conduit to short the electrodes of sensor 337 together, the voltage available between lines 338 and 340 is dropped across resistor 339. When water no longer passes between the electrodes of sensor 337, the resistance therebetween rises. Thus, most of the voltage between lines 338 and 340 is now dropped across sensor 337. The positive half cycles of this voltage charge capacitor 342 through diode 341. When the voltage level on capacitor 342 reaches the firing voltage of transistor 343, it goes into conduction. As current dumps from capacitor 342 through resistor 344, the voltage at the base 2 electrode of transistor 343 rises. This voltage pulse is transferred through capacitor 346 to the gate electrode of thyristor 347 thereby firing it. Thyristor 347 next shorts the accumulated charge on capacitor 350 through resistor 349. This generates a pulse on line 250 which triggers termination of the drain operation.

FIG. 7 shows rinse sensor 143 which detects whether sufficient DEEP RINSE operations have been performed to completely remove all soap and redeposited dirt from the clothing. The circuit is made up of four sub-circuits; namely a bridge circuit 359, a bridge output detector and amplifier circuit 360, a unijunction oscillator circuit 361 and a rinse cancel relay actuation circuit 363. In general, bridge circuit 359 compares the conductivity of clean water added to tub 20 prior to each DEEP RINSE Step with that of water drained from tub 20 after each DEEP RINSE Step. When the conductivities of these two samples of water are equal, bridge circuit 359 balances, whereupon it ceases to transmit signal to amplifier circuit 360. This ultimately actuates cancel circuit 363 and further DEEP RINSE operations are terminated while the machine advances immediately to Step 11.

As noted in FIG. 4, primary 248 of transformer 247 is connected in parallel with drain valve 30. A secondary 352 of transformer 247 energizes bridge circuit 359 between the points 365 and 364. This insures AC input to bridge circuit 359 between points 364 and 365 only when the DRAIN operation is in progress.

As shown diagrammatically in FIG. 1, two sets of sensor electrodes 350 and 351 are located in the hydraulic circuitry of the machine. Electrode set 350 is located in conduit 28 which supplies water to tub 20 prior to each DEEP RINSE operation. Electrode set 351 is located in the machine's drain conduit which empties water from tub 20 after the DEEP RINSE operation. Following the fill operation, water is retained between sensor electrodes 350 due to the shape of conduit 28. Thus, the resistance between electrode set 350 depends on the conductivity of the clear water. During the DRAIN operation, drain water immerses electrode set 351. The resistance between these electrodes is thus dependent on the conductivity of drain water.

Looking now at bridge circuit 359, note electrode sets 351 and 352 form two legs of bridge circuit 359. A pair of resistors 355 and 356 form the third and fourth legs respectively. If the values of resistors 355 and 356 are equal, and the conductivity of water sensed by electrode sets 350 and 351 is equal, no voltage differential is present from line 358 to line 354. However, during the first DEEP RINSE Step, it is obvious that the conductivity of water drained from tub 20 will be greater than the conductivity of water added to the tub prior to the rinse operation, since soap and redeposited dirt were picked up during its stay in tub 20. This insures that the conductivity of water drained after the DEEP RINSE Step will be greater than the conductivity of water added prior to the DEEP RINSE Step. Thus, the resistance between electrode set 351 is less than the resistance between electrode set 350.

As the positive half-wave of AC applied by secondary 352 appears at point 364, the voltage drop across resistor 355 will be greater than that across electrode set 351 and line 358 will be at a higher potential than line 354. Thus, bridge circuit 359 generates an output which is applied to amplifier circuit 360 through resistor 357. Note that after several DEEP RINSE operations, water drained from tub 20 will not have picked up as much soap and redeposited dirt as during the initial DEEP RINSE Steps. Therefore, the conductivity sensed by electrode sets 350 and 351 will equalize. The voltage at point 358 now equals the voltage at point 354 and bridge output goes to zero.

Turning now to amplifier circuit 360, note that DC operation potential for this circuit is provided by the 25 volt DC potential present on line 263 (see FIG. 4). Resistor 366 connects line 263 to the source electrode of a field effect transistor 368. A parallel connected capacitor 369 and resistor 367 are connected from the drain electrode of transistor 366 to line 354. Resistors 366 and 367 bias the drain electrode of transistor 367 approximately 4 volts positive with respect to the gate electrode. Thus, with no input signal present at the gate electrode, transistor 368 is biased to an off condition. However, as long as the conductivities of water sensed by electrode sets 351 and 350 are unequal, each time voltage goes positive at point 364, a signal is applied to the gate electrode of transistor 368. This signal is sufficient to bias on transistor 368.

Connected in series between the source electrode of transistor 368 and the anode of a diode 373 is capacitor 370 and resistor 371. A resistor 375 ties the cathode of diode 373 to the base electrode of a transistor 377. A diode 372 has its anode connected to line 354 and its cathode connected to the connection point of diode 373 and resistor 371. Capacitor 374 connects line 354 to the connection point of diode 373 and resistor 375.

A further resistor 376 is connected between the base electrode of transistor 377 and line 354.

It is apparent that when transistor 368 is turned off, voltage is high at its source electrode. Current thus flows through capacitor 370, resistor 371, diode 373, resistor 375 into the base electrode of transistor 377, thereby turning it on. However, after capacitor 370 is fully charged, further current flow is blocked and transistor 377 turns off. If, once capacitor 370 was fully charged, transistor 368 were to be turned on, capacitor 370 could discharge therethrough. Thus, the next time field effect transistor 368 went out of conduction, current could again pass through capacitor 370 and on to the base electrode of transistor 377. As explained previously, with bridge circuit 359 in an unbalanced condition, a positive voltage pulse is transferred to the gate electrode of transistor 368 each time the voltage goes positive at point 364. This will alternately turn transistor 368 on and off. Thus, transistor 377 will alternately be turned on and off depending upon the conductive state of transistor 368. However, once output ceases from bridge circuit 359, including that DEEP RINSE Steps should be terminated, transistor 368 goes off permanently. Thus, capacitor 370 charges to its full value and further base current to transistor 377 is blocked. Thus it also remains turned off.

The collector electrode of transistor 377 leads into oscillator circuit 361 which is also supplied with operating potential from line 263. A resistor 378 is tied between line 263 and the collector electrode of transistor 377. A second resistor 379 connects the collector electrode of transistor 377 to capacitor 380, resistor 381 and the emitter electrode of a unijunction transistor 383. The other sides of capacitor 380 and resistor 381 are connected to line 354. A resistor 382 is connected from line 263 to the base 1 electrode of transistor 383, and a resistor 384 is connected between the base 2 electrode of transistor 383 and line 354.

With transistor 377 in conduction, current from line 263 supplied through resistor 378 is shorted to ground. Thus, a potential cannot build up on capacitor 380 and transistor 383 does not break over. This prevents pulses from appearing on line 385 when transistor 377 is in conduction. However, once transistor 377 goes permanently out of conduction, charge is diverted through resistor 379 to capacitor 380. When the voltage level on capacitor 380 reaches the breakover voltage of transistor 383, it fires and a pulse is generated on line 385. Thus, pulses appear on line 385 whenever bridge circuit 359 senses that the conductivities of clean rinse water and drain water are equal. The pulses on line 385 are transferred through capacitor 387 to thyristor 258. Thyristor 258 then fires and energizes relay 263 which terminates any further DEEP RINSE Steps as described previously.

While the invention has been particularly shown and described with reference to a preferred embodiment thereof, it will be understood by those skilled in the art that various changes in form and details may be made therein without departing from the spirit and scope of the invention.

The embodiments of the invention in which an exclusive property or privilege is claimed are defined as follows:

1. In a laundry apparatus, a semielectronic control system for directing the apparatus through a sequence of laundering operations performed during a sequence of discreet steps, the control system comprising:
   a. a plurality of electromechanical components for actuating various machine functions,
   b. multiposition switch means connected with the components for energizing one or more of the components during each of the sequence of discreet steps,
   c. a plurality of condition sensing means connected with said switch means for successive actuation thereby,
   d. sensor means located within the apparatus and connected with the plurality of condition sensing means for sensing conditions indicating the desirability of advancing from one of the sequential steps to a subsequent one, and
   e. actuating means connected with the condition sensing means for advancing the switch means to successive positions in response to signals produced by the condition sensing means.

2. In a laundry apparatus as defined in claim 1 and further including a tub for containing liquid in which fabrics are immersed during one of the laundering operations, inlet means for admitting liquid to the tub prior to said one laundering operation and drain means for expelling liquid from the tub following said one laundering operation; the sensor means further including first and second electrode means associated with the inlet means and the drain means respectively for sensing the conductivity of liquid passing therethrough, the first and second electrode means connected to one of said plurality of condition sensing means whereby said one laundering operation is terminated by advancement of the switch means when said first and second electrodes sense the conductivity of liquids passing through the inlet and drain means to be substantially equal.

3. In a laundry apparatus as defined in claim 2 wherein the inlet means includes a chamber for retaining a sample of liquid added to the tub prior to said one laundry operation and the drain means includes a conduit through which liquid passes following said one laundry operation, the first electrode means comprises first pair of conductors, electrically isolated from each other, mounted in the chamber to be immersed in the liquid sample retained therein and the second electrode means comprises a second pair of conductors, electrically isolated from each other, mounted in the conduit to be immersed in liquid passing therethrough.

4. In a laundry apparatus as defined in claim 2 wherein said one of said plurality of condition sensing means includes an electrical bridge circuit and the first and second electrode means comprise first and second adjacent legs of the bridge circuit.

5. In a laundry apparatus as defined in claim 1 and further including a drum for tumbling fabrics during one of the laundering operations and suction means associated with the drum for removing moisture from fabrics by drawing air therethrough at relatively high velocity during said one laundering operation; the sensor means including electrode means associated with the suction means for sensing the water vapor content of the air passing through said suction means, the electrode means connected with one of the plurality of condition sensing means whereby said one laundry operation is terminated by advancement of the switch means when the water vapor content of air sensed by the electrode means drops below a predetermined level.

6. In a laundry apparatus as defined in claim 5 wherein the drum has an annular perforate area formed therein, the suction means includes a nozzle located adjacent said perforate area to draw air therethrough and the electrode means comprises a pair of conductors, electrically isolated from each other, mounted in said nozzle whereby the electrical resistance between said pair of electrodes is dependent on the water vapor content of air passing through said nozzle.

7. In a laundry apparatus as defined in claim 5, said one of the plurality of condition sensing means comprising:
   a. semiconductor means capable of assuming opposite conductive states having a control lead and first and second power leads, said electrode means connected between the control and first power leads whereby the conductive state of the semiconductor means varies in proportion to the water vapor content of air passing through the suction means,
   b. amplifier means connected with said second power lead of the semiconductor means whereby the output of the amplifier is proportional to the conductive state of the semiconductor means and,
   c. a pulse generator connected with the amplifier means and controlled therefrom whereby a pulse is generated in response to a predetermined level of output from the amplifier.

8. In a sequentially operated laundry apparatus having a control circuit and having a tub for containing liquid in which fabrics are immersed during at least one laundering operation, inlet means for admitting liquid to the tub prior to said one laundering operation and drain means for conducting liquid from the tub following said one laundering operation to a suitable drain; said control circuit including a purge control circuit comprising:
   a. electrically controlled diverter means connected with the inlet means and having first and second outlet ports communicating with the tub and the drain means respectively, the diverter means capable in a first energized state of directing liquid from the inlet means to the first outlet port and in a second energized state of directing liquid from the inlet means to the second outlet port;
   b. condition responsive circuitry connected with the diverter means for switching the diverter means between said first and second energized states and for interrupting the sequential operation of said laundry apparatus when said diverter means is in said second energized state;
   c. temperature responsive means associated with the inlet means for sensing the temperature of liquid passing therethrough and connected with the condition responsive circuitry whereby said diverter means is transferred from said second to said first energized state when liquid passing through the inlet means attains a predetermined temperature.

9. In a laundry apparatus as defined in claim 8 wherein the inlet means comprises a water conduit and the temperature responsive means is a thermistor disposed within said conduit.

* * * * *